(12) United States Patent
Harvey et al.

(10) Patent No.: US 8,763,855 B1
(45) Date of Patent: Jul. 1, 2014

(54) MOUNTED BLADDER FOR STORAGE TANK

(75) Inventors: James F. Harvey, Weiman, TX (US);
Pete K. Alvarez, Pasadena, TX (US);
Rodney Scott Holland, Deer Park, TX (US); Rodney Scott Holland, Jr., Deer Park, TX (US); John Bilke, Katy, TX (US); Tommy Garcia, Houston, TX (US); Jon Daniel, Victoria, TX (US)

(73) Assignee: Hydrochem LLC, Atlanta, GA (US)

( * ) Notice: Subject to any disclaimer, the term of this patent is extended or adjusted under 35 U.S.C. 154(b) by 595 days.

(21) Appl. No.: 12/961,928

(22) Filed: Dec. 7, 2010

Related U.S. Application Data

(60) Provisional application No. 61/267,333, filed on Dec. 7, 2009, provisional application No. 61/370,748, filed on Aug. 4, 2010.

(51) Int. Cl.
*B67B 7/00* (2006.01)

(52) U.S. Cl.
USPC ............... 222/1; 222/105; 222/131; 222/333; 222/386.5; 222/389; 222/626

(58) Field of Classification Search
USPC ............... 222/1, 51, 74–75, 92–96, 105–107, 222/129, 130–131, 608–610, 626, 251–263, 222/333–334, 335, 386.5, 383.1, 389, 406
See application file for complete search history.

(56) References Cited

U.S. PATENT DOCUMENTS

| | | | |
|---|---|---|---|
| 406,718 A * | 7/1889 | Fish ............................ 417/345 |
| 2,664,911 A | 1/1954 | Thompson et al. |
| 2,731,297 A * | 1/1956 | Meyer ............................ 141/27 |
| 2,836,963 A | 6/1958 | Fox |
| 3,315,611 A | 4/1967 | Thompson |
| 3,680,560 A | 8/1972 | Pannier, Jr. et al. |
| 3,866,474 A | 2/1975 | Hasselmann |
| 3,949,720 A | 4/1976 | Zipprich et al. |
| 4,082,124 A * | 4/1978 | Jenkins ............................ 141/65 |
| 4,213,479 A | 7/1980 | Pearson |
| 4,461,402 A | 7/1984 | Fell et al. |
| 4,681,571 A | 7/1987 | Nehring |
| 4,796,676 A | 1/1989 | Hendershot et al. |
| 5,038,960 A | 8/1991 | Seery |
| 5,067,636 A | 11/1991 | Pfeiffer et al. |
| 5,176,178 A * | 1/1993 | Schurter et al. ............... 138/30 |
| 5,183,086 A | 2/1993 | Fanta et al. |
| 5,234,419 A | 8/1993 | Bryant et al. |
| 5,279,602 A | 1/1994 | Middaugh et al. |
| 5,282,550 A | 2/1994 | Coleman |
| 5,397,020 A | 3/1995 | Witt |
| 5,505,327 A | 4/1996 | Witt |
| 5,555,997 A | 9/1996 | Nogles |
| 5,613,622 A | 3/1997 | Surrena et al. |
| 5,636,760 A | 6/1997 | Yamamoto et al. |
| 6,224,345 B1 | 5/2001 | Dussault |
| 6,286,700 B1 | 9/2001 | Davidson |
| 6,390,332 B2 * | 5/2002 | Wakayama ................... 222/105 |

(Continued)

*Primary Examiner* — Paul R Durand
*Assistant Examiner* — Andrew P Bainbridge
(74) *Attorney, Agent, or Firm* — Greenberg Traurig LLP

(57) ABSTRACT

An apparatus and method for collection and containment of collected materials is provided. The apparatus can include a vacuum truck with at least one vacuum tank, the vacuum tank having a hollow interior region. A flexible bladder can be disposed within the hollow interior region of the vacuum tank. The bladder can be impermeable to and compatible with the collected material and capable of containing the material.

14 Claims, 5 Drawing Sheets

(56) References Cited

U.S. PATENT DOCUMENTS

| | | |
|---|---|---|
| 6,508,363 B1 | 1/2003 | Crevasse |
| 6,681,789 B1 | 1/2004 | Moulis et al. |
| 6,786,364 B2 * | 9/2004 | McBride ............ 222/389 |
| 6,988,639 B2 | 1/2006 | Arch |
| 7,013,924 B1 | 3/2006 | Meyers et al. |
| 7,086,429 B2 | 8/2006 | Moizumi |
| 7,128,838 B2 | 10/2006 | Dorin et al. |
| 7,147,689 B1 * | 12/2006 | Miller ............ 95/92 |
| 7,255,133 B2 | 8/2007 | Meyers et al. |
| 7,506,776 B2 | 3/2009 | Podd |
| 7,954,670 B2 * | 6/2011 | Stuart ............ 222/95 |
| 2005/0040253 A1 | 2/2005 | Thornton |
| 2005/0196331 A1 | 9/2005 | Dove |
| 2007/0023438 A1 | 2/2007 | Kenneth, Jr. |
| 2008/0271811 A1 | 11/2008 | Healy |
| 2009/0242566 A1 | 10/2009 | Witheridge |

\* cited by examiner

MOUNTED BLADDER FOR STORAGE TANK

RELATED APPLICATIONS

This Application claims the benefit, and priority benefit, of U.S. Provisional Patent Application Ser. No. 61/267,333, filed Dec. 7, 2009, entitled "Bladder System For Storage Tank," and U.S. Provisional Patent Application Ser. No. 61/370,748, filed Aug. 4, 2010, entitled "Bladder System With Carbon Scrubber For Storage Tank," both of which are incorporated herein in their entireties.

BACKGROUND

1. Field of Invention

The present subject matter relates generally to the field of reduction of materials emissions, and in particular, to a vacuum tank containing a flexible bladder for the containment of collected materials.

2. Description of the Related Art

Vacuum trucks, vacuum boxes and other similar vehicles or containers can be utilized to collect liquid materials. During the collection process, the materials sometimes produce vapor emissions that can be discharged into the atmosphere. For example, these exhaust emissions may be discharged from a vacuum pump used to deliver the materials to the vacuum tank or vented from a valve or other opening on the vacuum tank. These exhaust emissions can contain compounds such as benzene and hexane which can be harmful to the environment and cause health concerns. Federal, state and local regulations are requiring significant reductions of discharge of volatile organic compounds (VOCs) into the atmosphere. Thus, a reduction in the amount of these materials emissions is desired.

Figure 1:
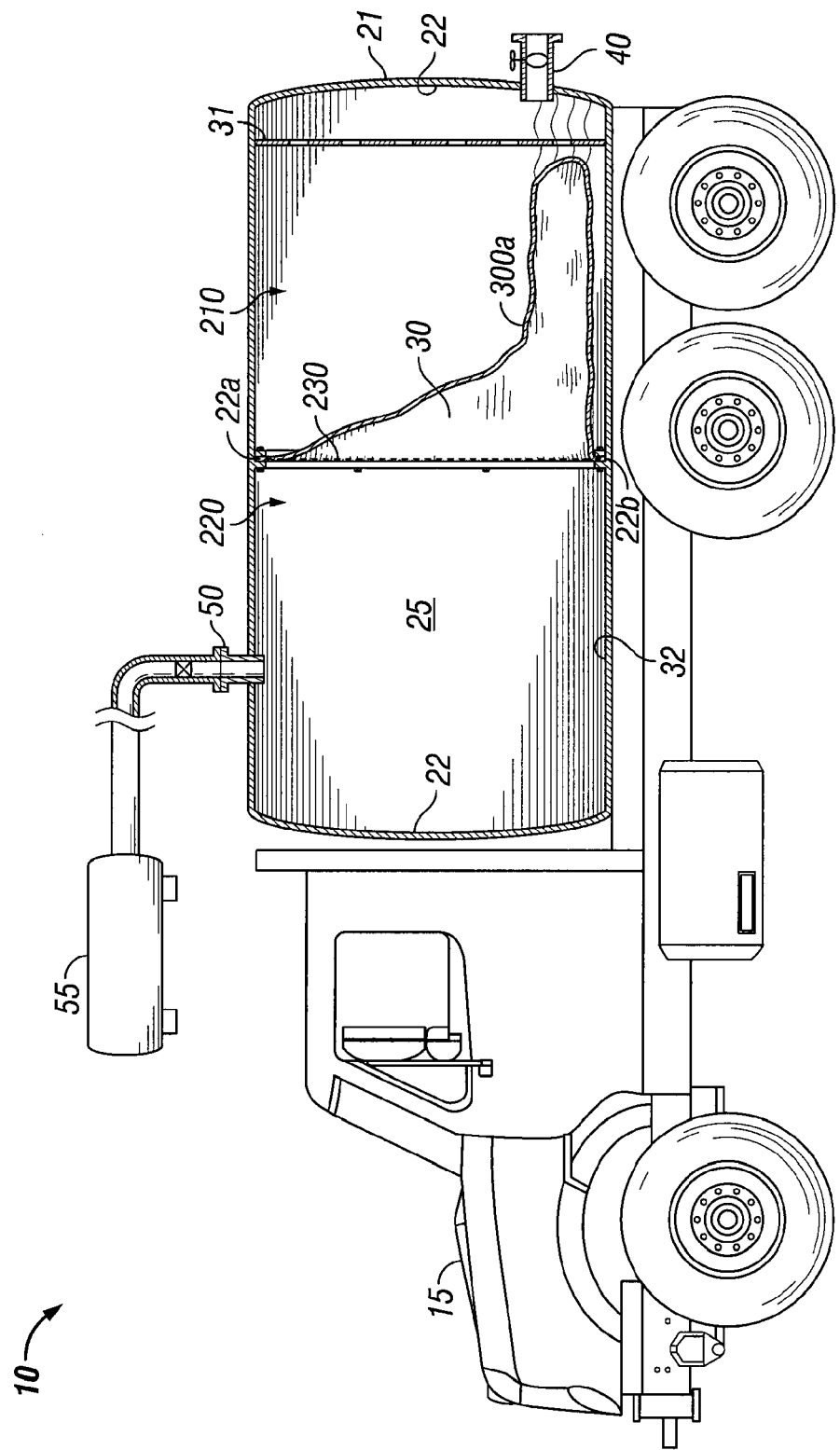
FIG. 1 is a side view of a vacuum tank having a bladder disposed in the first section of its interior region in an illustrative embodiment.

While certain embodiments will be described in connection with the preferred illustrative embodiments, it will be understood that it is not intended to limit the invention to those embodiments. On the contrary, it is intended to cover all alternatives, modifications, and equivalents, as may be included within the spirit and scope of the subject matter as defined by the claims provided herein.

SUMMARY

In accordance with the illustrative embodiments hereinafter described, an apparatus and method for collection and containment of collected materials is described.

In an illustrative embodiment, the apparatus can include, for example, a vacuum truck with at least one vacuum tank disposed thereon, the vacuum tank having a hollow interior region. A flexible bladder can be disposed within the hollow interior region of the vacuum tank. The bladder can be impermeable to and compatible with the collected material and capable of containing the material therewithin.

At least one opening can be formed in the bladder to allow the materials to enter or exit the bladder. The bladder can expand to collect and contain the materials. In an illustrative embodiment, the bladder can substantially conform to the dimensions of the hollow interior region of the vacuum tank when it is fully expanded.

An access port can be disposed on the vacuum tank to allow access to the hollow interior region of the tank. A vacuum pump can be attached to the access port to regulate the pressure of the hollow interior region of the tank, external to the bladder. When the vacuum is drawn on the hollow interior region, the bladder can expand to collect and contain the collected material therewithin.

The vacuum pump can be operable to pull a vacuum on the hollow interior region of the tank, external to the bladder. Further, the vacuum pump can be operable to pressurize or depressurize the hollow interior region of the tank, external to the bladder. The bladder can be impermeable to and compatible with the material. The bladder can be emptied when the vacuum pump pressurizes the hollow interior region of the tank, external to the bladder, or filled when the vacuum pump depressurizes the hollow interior region of the tank, external to the bladder.

The hollow interior region of the storage tank can have a first section, a second section and an engagement line therebetween. A bladder can be disposed at the engagement line. The bladder can be operable to contain the collected material therewithin. The engagement line can divide the hollow interior region such that the first section and the second section of the storage tank have substantially the same volume. A mounting ring can be disposed on the interior surface of the tank at the engagement line. The bladder can be affixed to the mounting ring. The position of the mounting ring can be adjustable along the interior surface of the tank. The bladder can be substantially disposed within the first section when the storage tank is pressurized and the bladder can be substantially disposed within the second section when the storage tank is depressurized.

In an illustrative embodiment, a method of loading collected materials into a bladder located within a vacuum tank is provided. A hollow interior region can be provided within the vacuum tank. The hollow interior region can have a first section and a second section. The bladder can be within the first section of the hollow interior region. At least one opening can be provided on the bladder for the collected materials to enter the bladder. The hollow interior region can be depressurized external to the bladder to inflate the bladder. The collected materials can be pulled into the bladder such that the bladder relocates from the first section to the second section.

In an illustrative embodiment, a method of unloading collected materials from a bladder located within a vacuum tank can be provided. A hollow interior region can be provided within the vacuum tank. The bladder can be located within the second section of the hollow interior region. At least one opening can be provided on the bladder for the collected materials to exit the bladder. The hollow interior region can be pressurized external to the bladder to empty the bladder. The collected materials can be pushed from the bladder such that the bladder relocates from the second section to the first section.

In certain of the present illustrative embodiments, the collected material is not released into the hollow interior region of the tank since the bladder is impermeable to and compatible with the volatile material. Thus, the likelihood of any of the collected materials being released into the atmosphere from the hollow interior region is substantially reduced.

DETAILED DESCRIPTION

Referring now to FIGS. 1-9, illustrative embodiments of an apparatus and method for collection and containment of collected materials are provided.

Apparatus 10 can include at least one vacuum tank 20. In an illustrative embodiment, tank 20 can be disposed on a vacuum truck 15. Tank 20 can be formed of steel or other rigid material. Tank 20 can have an outer tank wall 21, an interior tank wall surface 22 and a hollow interior region 25. A bladder 30 can be disposed within hollow interior region 25. Bladder 30 can store liquid, solids and/or vapor materials. Examples of materials that can be collected and stored include, without limitation, acids, alkaline materials, and/or hydrocarbons such as straight run gasoline, sour naphtha, raffinate, jet fuel and platformate, and any related vapors and/or emissions. Further, the collected materials can be liquids, sludges or liquids containing particulate solid matter.

Bladder 30 can be impermeable to, and compatible with, the collected materials to prevent, or substantially prevent, the materials from passing into, or dispersing within, hollow interior region 25 of tank 20. Impermeable generally means some or all of the materials cannot pass through bladder 30, or are substantially or significantly unable to pass through bladder 30. Compatible generally means the materials will not react with or dissolve bladder 30 or the level of reacting or dissolving is substantially or significantly reduced. Bladder 30 can be utilized to collect and contain exhaust emissions from the collected materials and prevent the collected materials from being discharged to the atmosphere.

In certain illustrative embodiments, bladder 30 can be formed of a flexible material, so that bladder 30 generally conforms to the shape of the interior region 25 of tank 20 when bladder 30 is filled to, or near, capacity or otherwise engages or substantially engages the interior wall 22 of tank 20. In certain illustrative embodiments, bladder 30 can be emptied and lie against, or near, a rear wall 31 and/or a bottom surface 32 (FIG. 1) of tank 20 when bladder 30 is empty or substantially empty, and can expand in a balloon-type fashion to substantially conform to the shape of interior region 25 (FIG. 2) when bladder 30 is filled. In certain illustrative embodiments, bladder 30 can be detachably connected to an inner wall surface 22 of interior region 25 of tank 20 at a plurality of surface points 22a, 22b.

At least one opening 35 can be formed in bladder 30 to allow liquid or vapor materials to enter or exit bladder 30. Tank inlet 40 can be disposed in wall 21 of tank 20, whereby the liquid or vapor material can pass through tank inlet 40 when tank inlet 40 is open in order to enter or exit bladder 30 via opening 35. In certain illustrative embodiments, a vacuum can be drawn within interior region 25 of tank 20 to cause expansion of bladder 30 (See, e.g., FIG. 2). For example, tank 20 can have at least one vacuum pump connection 50 disposed thereon that is accessible to interior region 25. An external vacuum source, for example a vacuum pump 55, can be attached to vacuum pump connection 50 and utilized to draw a vacuum on interior region 25 of tank 20. When the vacuum is drawn on tank 20, liquid material can flow from the liquid source, for example, an industrial tank 60, through inlet 40 and into bladder 30 through opening 35. Bladder 30 can fill up and/or expand to collect the liquid material. In certain illustrative embodiments, any vapors, volatile emissions or other compounds emanating from the liquid material can be contained within bladder 30 without evacuating into interior region 25 through bladder 30. Thus, the likelihood of any environmentally detrimental or hazardous exhausts entering the atmosphere from interior region 25 can be substantially reduced.

In certain illustrative embodiments, interior region 25 of tank 20 can be pressurized to empty material out of bladder 30. External vacuum pump 55 can be utilized to introduce pressurized air into interior region 25 of tank 20 via vacuum pump connection 50. When interior region 25 is pressurized, liquid material can flow out of bladder 30 through opening 35 and tank inlet 40 and bladder 30 will empty and/or collapse. In a specific illustrative embodiment, vacuum pump connection 50 can be opened and liquid material can gravity-feed out of bladder 30 via opening 35 and tank inlet 40, without the need for pressurizing with external vacuum pump 55.

In an illustrative embodiment, tank 20 can have a first end 70 and a second end 75, and first end 70 can have a door 27 that can open to allow for cleaning of bladder 30. (See, e.g., FIG. 3). For example, opening of bladder 30 can be sized to substantially fit on, or around, a mounting ring 90 of tank 20. In certain illustrative embodiments where tank 20 has a rounded shape, opening 35 can be sized to fit around the circumference of mounting ring 90. Even when door 27 is open, the seal formed between opening 35 of bladder 30 and mounting ring 90 of tank 20 can prevent cleaning materials entering opening 35 of bladder 30 from accessing interior region 25 of tank 20. Bladder 30 can have a shape much like the interior region of tank 20, such that when door 27 is closed and a vacuum is pulled on interior region 25, bladder 30 can expand to substantially conform to the shape of interior region 25. When door 27 is opened, the interior of bladder 30 can be cleaned by engaging vacuum pump 55 to create a vacuum in interior region 25, such that bladder 30 can substantially conform to the shape of interior region 25 thus presenting a large opening inside bladder 30 which can be utilized for washout. In certain illustrative embodiments, bladder 30 can be detachable from mounting ring 90 such that bladder 30 can be removed from interior region 25 of tank 20 and tank 20 can be cleaned.

In certain illustrative embodiments (FIGS. 4 & 5), a carbon scrubber 100 can be utilized to capture and absorb any fugitive emissions that could potentially escape and/or exit through bladder 30 and/or exhaust of vacuum pump 55. The carbon scrubber 100 can be a back-up system for capturing escaping emissions that are not captured by bladder 30. A vacuum can be drawn on the interior of tank 20 using vacuum pump 55. In certain illustrative embodiments, a plurality of vacuum pump connections 50a, 50b can be utilized to connect vacuum pump 55 to tank 20. Fugitive emissions can be transported via exhaust line 120 to carbon scrubber 100. A plurality of carbon scrubbers 100a, 100b can be utilized. The vacuum stream can be vented to atmosphere via vent 140 after being treated and cleaned by scrubbers 100a, 100b. A monitor 150 can disposed at or near scrubbers 100a, 100b to measure content of fugitive emissions. A flame arrester 160 can be disposed at or near emissions line 120 to prevent back-flashing into tank 20. One or more knockout pots 110, 130 can be utilized to collect liquid condensation.

Figure 6:
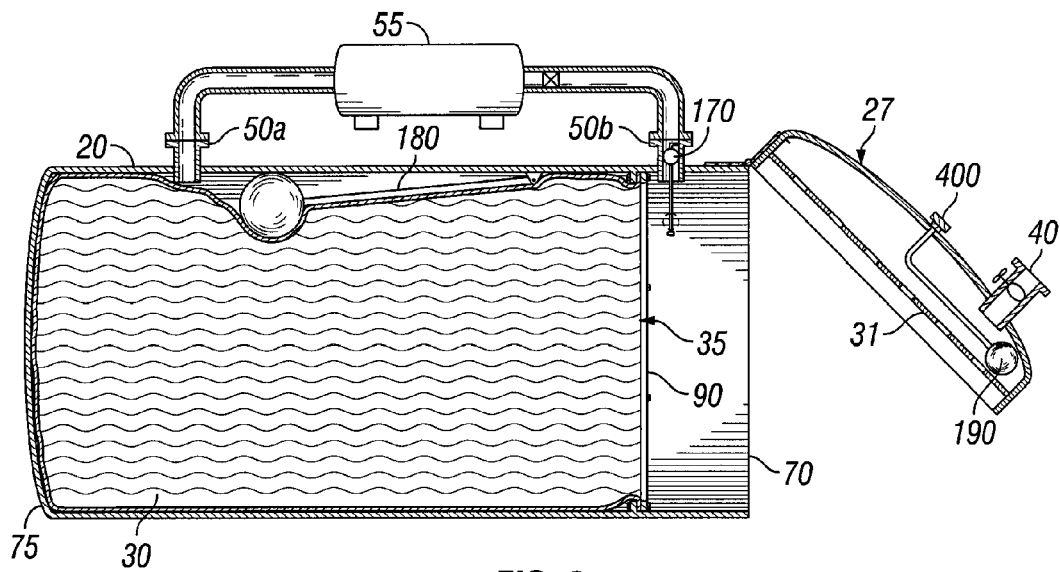
FIG. 6 is a side view of a vacuum tank with an expanded bladder in an illustrative embodiment.
Figure 8:
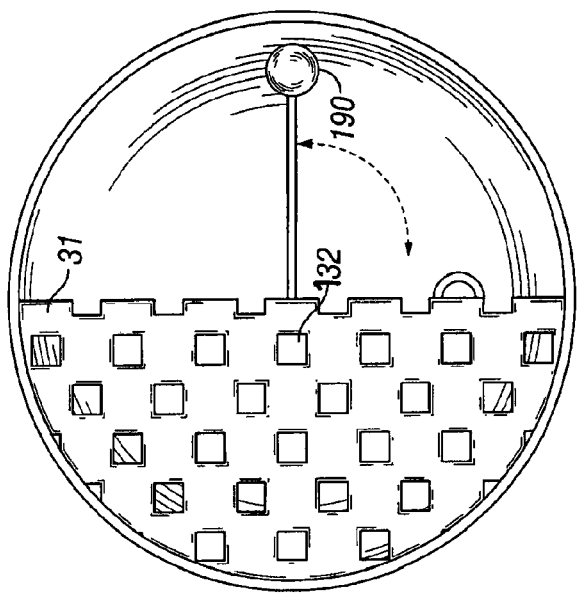
FIG. 8 is a front view of a door with a rear wall (partially shown) for a vacuum tank having a liquid level indicator disposed thereon in an illustrative embodiment.
Figure 7:
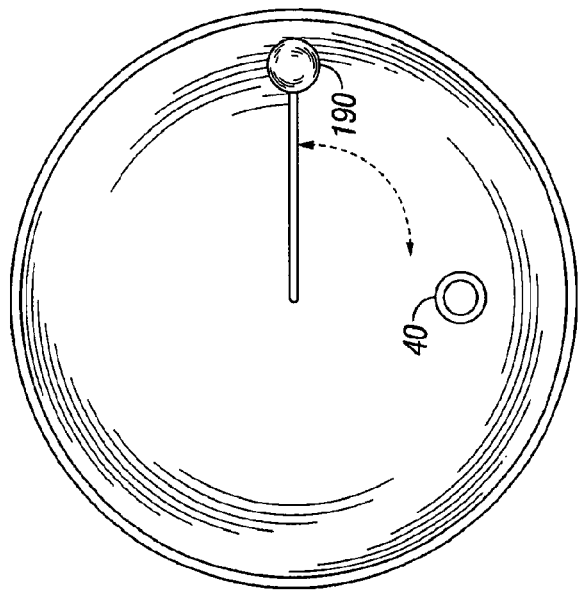
FIG. 7 is a front view of a door with a rear wall removed for a vacuum tank having a liquid level indicator disposed thereon in an illustrative embodiment.
Figure 9:
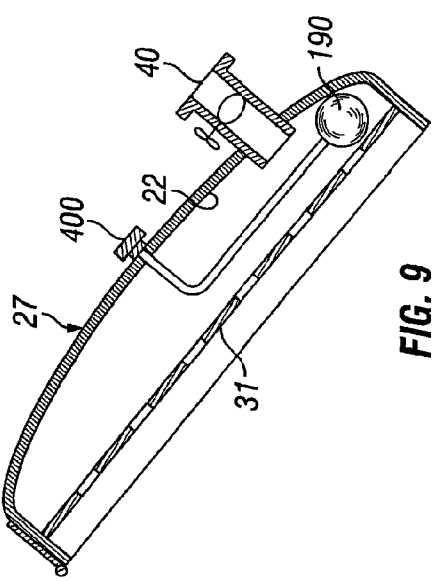
FIG. 9 is a side view of a door for a vacuum tank having a liquid level indicator disposed thereon in an illustrative embodiment.

As illustrated in FIG. 6, a float 170 can be disposed within vacuum pump connection 50 to seal and prevent liquid from exiting tank 20. In certain illustrative embodiments, a bladder level indicator 180 can be disposed exterior of bladder 30 within tank 20 to measure the bladder level with tank 20. A liquid level indicator 190 can be disposed at the interior of door 27 to measure the liquid level in bladder 30. Gauges 400 (see FIGS. 3, 4 & 6) can be disposed on the wall of tank 20 to allow a user to read the levels measured by bladder level indicator 180 and liquid level indicator 190.

In certain illustrative embodiments, rear wall 31 can be disposed at, or near, rear door 27 to cover and protect level indicator 190. (See FIGS. 6, 9 & 10). In an illustrative embodiment, rear wall 31 can be affixed to, and extend across the entire diameter of, rear door 27. One or more perforations 132 can be formed in rear wall 31. Perforations 132 can allow liquid and/or vapor to flow through rear wall 31, while filtering unwanted solid materials.

Prior to beginning certain vacuuming operations, it may be necessary to empty bladder 30 within tank 20. (See, e.g., FIG. 1). This can be done, for example, by utilizing vacuum pump 55 to provide air pressure on the outer surface of bladder 30. As bladder 30 is emptied, it can potentially press against rear wall 31 or interior tank wall surface 22, or components disposed thereon. If pressed too forcefully, bladder 30 could be torn or damaged, or bladder 30 could potentially crush or damage rear wall 31, wall surface 22 or the components disposed thereon.

Figure 2:
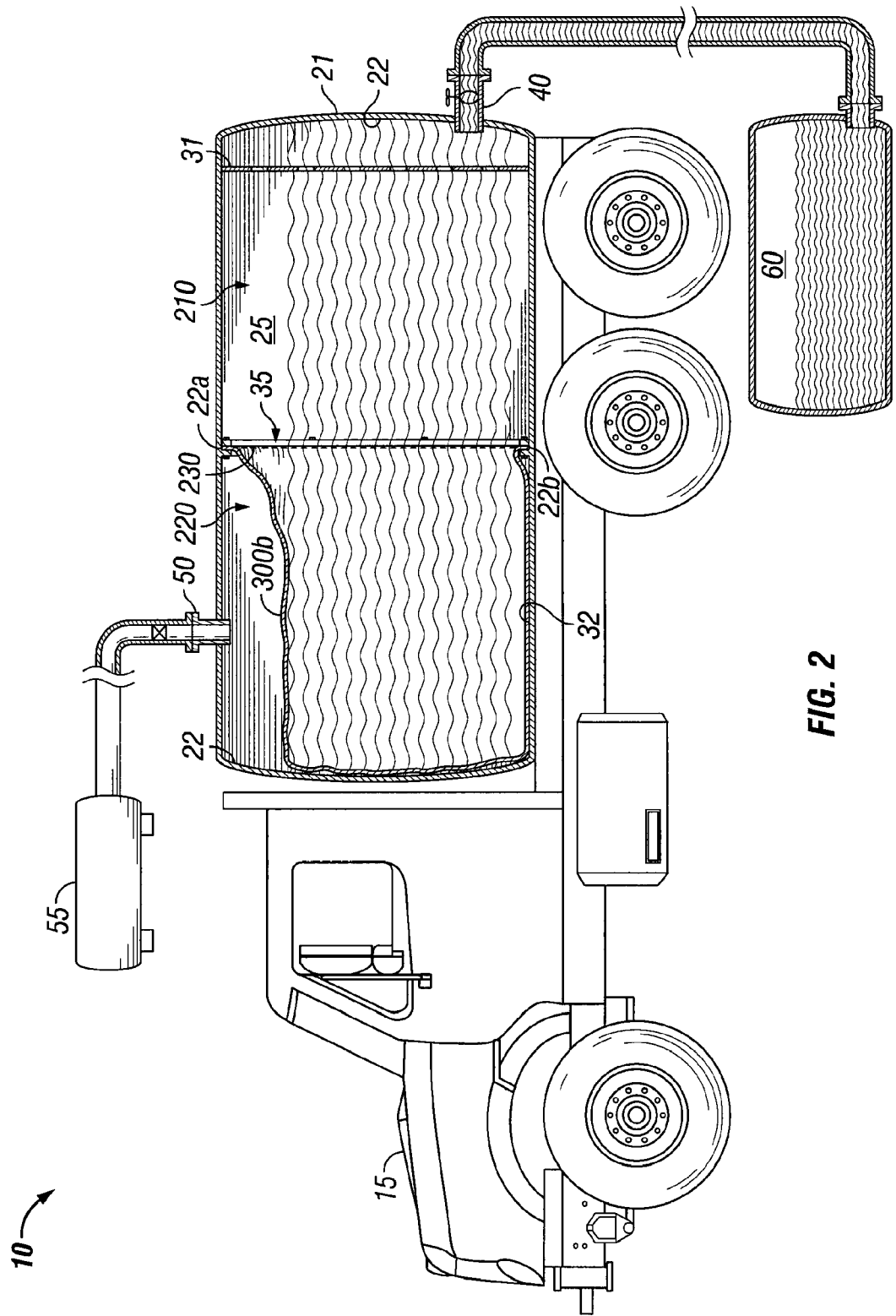
FIG. 2 is a side view of a vacuum tank having a bladder disposed in a second section of its interior region in an illustrative embodiment.
Figure 3:
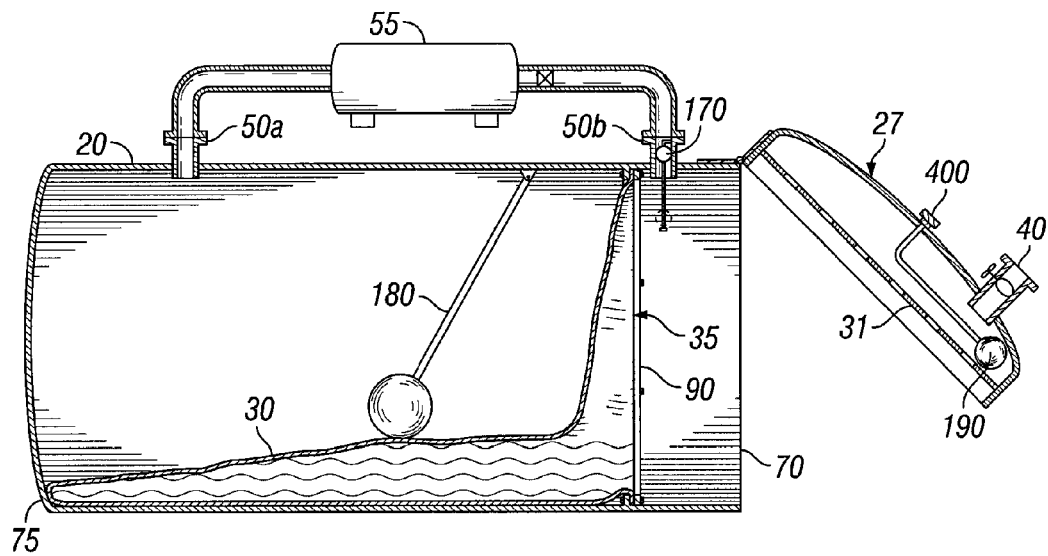
FIG. 3 is a side view of a vacuum tank with a collapsed bladder in an illustrative embodiment.
Figure 4:
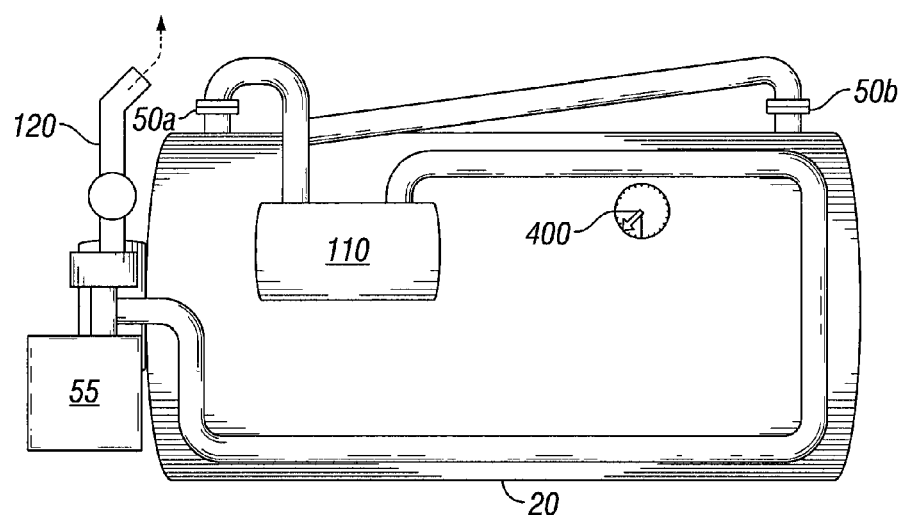
FIG. 4 is a side view of a vacuum tank exhaust system in an illustrative embodiment.
Figure 5:
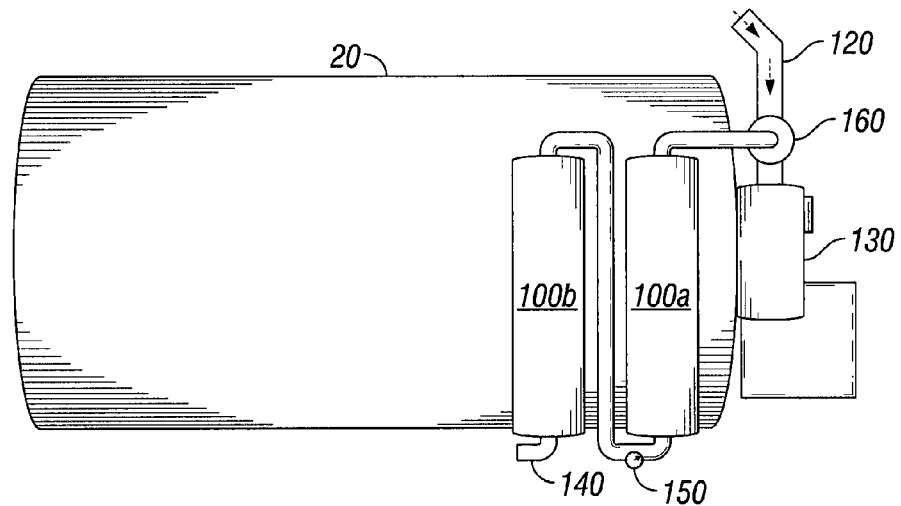
FIG. 5 is a side view of a vacuum tank having a carbon scrubber system for vacuum tank exhaust in an illustrative embodiment.

In certain illustrative embodiments, interior region 25 of tank 20 can comprise at least two sections, including a first section 210 and a second section 220 (See FIGS. 1 & 2). First section 210 and second section 220 can meet at an engagement line 230 disposed at inner wall surface 22 of tank 20. In certain embodiments, engagement line 230 can divide tank 20 at an approximate midpoint such that first section 210 and second section 220 have similar, or substantially similar, shapes and volumes. In other embodiments, engagement line 230 can divide tank 20 at a location that is not an approximate midpoint, such that first section 210 will be larger than, or smaller than, second section 220. In certain illustrative embodiments, mounting ring 90 can be disposed at engagement line 230, and the position of mounting ring 90 can be adjustable along the interior surface of tank 20, depending upon where bladder 30 should be positioned. Bladder 30 can be detachably connected to the inner wall surface 22 of interior region 25 of tank 20 at mounting ring 90.

In certain illustrative embodiments, the shape and location of bladder 30 can be controlled and manipulated as bladder 30 expands and/or contracts, or is otherwise repositioned, within interior region 25. In an illustrative embodiment, bladder 30 can be positioned within the first section 210 of tank 20 when bladder 30 is empty. (FIG. 1). When a vacuum is pulled on tank 20 and tank 20 is depressurized, bladder 30 can expand in a balloon-type fashion and relocate into second section 220 of tank 20. (FIG. 2).

In certain illustrative embodiments, bladder 30 is capable of being repositioned within interior region 25 such that a first layer 300a of bladder 30 is closest to interior tank wall surface 22 when bladder is within first section 210, and a second layer 300b of bladder 30 is closest to interior tank wall surface 22 when bladder is within second section 220. As bladder 30 fills with collected material and bladder moves from first section 210 to second section 220, bladder 300 is flipped "inside out" within tank 20 to contain the collected materials, but first layer 300a is always in direct contact with the collected materials, in certain illustrative embodiments.

In certain illustrative embodiments where engagement line 230 divides tank 20 at an approximate midpoint such that first section 210 and second section 220 have similar, or substantially similar, shapes and volumes, a smaller sized bladder 30 can be utilized than if engagement line 230 was located closer to front end 70 or rear end 75 of tank 20. As a result, bladder 30 can have fewer wrinkles to trap vacuumed material, and can also potentially contact a smaller surface area on inner wall surface 22 of tank 20, thus reducing the chance of bladder 20 becoming torn or worn.

According to the present illustrative embodiments, the collected materials can be deposited within bladder 30 and then transported within a facility or to a separate location for treatment, disposal, discharge or storage. The present illustrative embodiments are not limited to use with only mobile vehicles such as vacuum trucks. For example, any storage device, whether mobile or stationary, that is capable of utilizing bladder 30 to collect and contain materials under vacuum conditions would be in accordance with the present illustrative embodiments.

In the drawings and specification, there has been disclosed and described typical illustrative embodiments, and although specific terms are employed, the terms are used in a descriptive sense only and not for purposes of limitation. It will be apparent that various modifications and changes can be made within the spirit and scope of the subject matter as described in the foregoing specification. Accordingly, the subject matter is therefore to be limited only by the scope of the claims provided herein.

What is claimed is:

1. An apparatus for containment of collected materials, the apparatus comprising:
   at least one storage tank, the storage tank having a hollow interior region with a first section, a second section and an engagement line therebetween;
   a bladder disposed at the engagement line, the bladder being operable to contain the material therewithin;
   at least one opening formed in the bladder to allow the materials to enter or exit the bladder;
   an access port disposed on the storage tank and accessible to the hollow interior region of the tank;
   a vacuum pump attachable to the access port and operable to regulate the pressure of the hollow interior region of the tank, external to the bladder; and
   a mounting ring disposed on an interior surface of the tank at the engagement line, wherein the bladder is affixed to the mounting ring and the position of the mounting ring is adjustable along the interior surface.

2. The apparatus of claim 1, wherein the vacuum pump is operable to pull a vacuum on the hollow interior region of the tank, external to the bladder.

3. The apparatus of claim 1, wherein the vacuum pump is operable to pressurize or depressurize the hollow interior region of the tank, external to the bladder.

4. The apparatus of claim 1, wherein the bladder is impermeable to and compatible with the material.

5. The apparatus of claim 1, wherein the bladder is emptied when the vacuum pump pressurizes the hollow interior region of the tank, external to the bladder.

6. The apparatus of claim 1, wherein the bladder is filled when the vacuum pump depressurizes the hollow interior region of the tank, external to the bladder.

7. The apparatus of claim 1, wherein the engagement line divides the hollow interior region such that the first section and the second section of the storage tank have substantially the same volume.

8. The apparatus of claim 3, wherein the bladder is substantially disposed within the first section when the storage tank is pressurized and the bladder is substantially disposed within the second section when the storage tank is depressurized.

9. The apparatus of claim 1, wherein the storage tank is disposed on a vacuum truck.

10. The apparatus of claim 1, further comprising one or more carbon scrubbers disposed on a exhaust stream of the vacuum pump to absorb collected materials from the exhaust stream.

11. A method of loading materials into a bladder located within a vacuum tank, the method comprising:
   providing a hollow interior region within the vacuum tank, the hollow interior region having a first section and a second section;
   providing a mounting ring on an interior surface of the tank, wherein the bladder is affixed to the mounting ring and the position of the mounting ring is adjustable along the interior surface;
   locating the bladder within the first section of the hollow interior region;
   providing at least one opening on the bladder for the materials to enter the bladder;
   depressurizing the hollow interior region external to the bladder to fill the bladder; and
   pulling the materials into the bladder such that the bladder relocates from the first section to the second section.

12. The method of claim 11, further comprising:
   providing an engagement line within the hollow interior region that divides the first section and the second section into approximately equal volumes.

13. A method of unloading collected materials from a bladder located within a vacuum tank, the method comprising:
   providing a hollow interior region within the vacuum tank, the hollow interior region having a first section and a second section;
   providing a mounting ring on an interior surface of the tank, wherein the bladder is affixed to the mounting ring and the position of the mounting ring is adjustable along the interior surface;
   locating the bladder within the second section of the hollow interior region;
   providing at least one opening on the bladder for the collected materials to exit the bladder;
   pressurizing the hollow interior region external to the bladder to empty the bladder; and
   pushing the collected materials from the bladder such that the bladder relocates from the second section to the first section.

14. The method of claim 13, further comprising:
   providing an engagement line within the hollow interior region that divides the first section and the second section into approximately equal volumes.

\* \* \* \* \*